(12) United States Patent
Paycher et al.

(10) Patent No.: US 12,067,328 B2
(45) Date of Patent: Aug. 20, 2024

(54) JOINING AN EXISTING AUDIO SESSION

(71) Applicant: Apple Inc., Cupertino, CA (US)

(72) Inventors: Alon Paycher, Beit Hananya (IL);
Sriram Hariharan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 154 days.

(21) Appl. No.: 17/305,418

(22) Filed: Jul. 7, 2021

(65) Prior Publication Data
US 2023/0008802 A1    Jan. 12, 2023

(51) Int. Cl.
*G06F 3/16*    (2006.01)
*H04R 1/10*    (2006.01)

(52) U.S. Cl.
CPC .......... *G06F 3/165* (2013.01); *H04R 1/1041* (2013.01); *H04R 2420/07* (2013.01)

(58) Field of Classification Search
CPC ... G06F 3/165; H04R 1/1041; H04R 2420/07; H04R 5/04; H04R 5/033; H04R 2420/05; H04L 65/1093; H04L 65/1069; H04W 4/80
USPC ....................................................... 455/41.3
See application file for complete search history.

(56) References Cited

U.S. PATENT DOCUMENTS

| | | | |
|---|---|---|---|
| 10,840,995 B1* | 11/2020 | Luong | H04L 43/106 |
| 2019/0104423 A1 | 4/2019 | Hariharan et al. | |
| 2019/0182557 A1* | 6/2019 | Tull | H04N 21/439 |
| 2020/0107174 A1 | 4/2020 | Tong et al. | |
| 2020/0177348 A1* | 6/2020 | Agarwal | H04L 1/1854 |

\* cited by examiner

*Primary Examiner* — Eugene Yun
(74) *Attorney, Agent, or Firm* — Fay Kaplun & Marcin, LLP

(57) ABSTRACT

An audio output device may join an existing session between a source device and another audio output device. The source device may transmit audio data associated with an audio session, using a first frequency band, to a first wireless audio output device and transmit connection information associated with the audio session to a second wireless audio output device over a second frequency band. The second frequency band differs from the first frequency band and the connection information allows the second wireless audio output device to join the audio session. After transmitting the connection information, the source device may transmit subsequent audio data associated with the audio session to the first wireless audio output device and the second wireless audio output device.

13 Claims, 6 Drawing Sheets

Fig. 6

Single-Bud Stage 510: TX 605 | RX 610 | TX 605 | RX 610 | TX 605 | RX 610 | TX 605 | RX 610

Transition Stage 520: TX 605 | RX 610 / 615 | TX 605 | RX 610 / 615 | TX 605 | RX 610 / 615 | TX 605 | RX 610 / 615

Transition Stage 520: TX 605 | RX 610 / 620 | TX 605 | RX 610 / 620 | TX 605 | RX 610 / 620 | TX 605 | RX 610 / 620

JOINING AN EXISTING AUDIO SESSION

BACKGROUND

A user equipment (UE) may provide audio data to one or more wireless audio output devices using a short-range communication protocol. For example, a user may have the UE and a pair of wireless audio buds. The UE may communicate with the wireless audio buds using a short-range communication protocol such as Bluetooth. Once connected, the user may listen to music, a call or any other type of audio with the wireless audio buds.

In a common use scenario, the user may start listening to audio using a single wireless audio bud. Subsequently, the user may want to use both wireless audio buds for this session. However, for any of a variety of different reasons, the second wireless audio bud may experience connectivity issues and be unable to seamlessly join the existing audio session. This has a negative impact on the user experience.

SUMMARY

Some exemplary embodiments are related to a processor configured to cause a source device to perform operations. The operations include transmitting audio data associated with an audio session, using a first frequency band, to a first wireless audio output device and transmitting connection information associated with the audio session to a second wireless audio output device over a second frequency band. The second frequency band differs from the first frequency band and the connection information allows the second wireless audio output device to join the audio session. The operations also include transmitting subsequent audio data associated with the audio session, after transmitting the connection information, to the first wireless audio output device and the second wireless audio output device.

Other exemplary embodiments are related to a processor configured to cause a first wireless audio output device to perform operations. The operations include establishing a communication link that operates on a first frequency band to a source device using a wireless communication protocol and receiving connection information from the source device associated with an audio session between the source device and a second wireless audio output device. The audio session operates on a second frequency band that differs from the first frequency band. The operations also include joining the audio session based on at least the connection information.

Still further exemplary embodiments are related to a processor configured to cause a first wireless audio output device to perform operations. The operations include establishing a communication link to a source device using a wireless communication protocol, receiving audio data associated with an audio session from the source device, receiving an indication that a second wireless audio output device is to join the audio session and modifying a packet size that is to be used by the first wireless audio output device to transmit feedback to the source device to accommodate transmissions that are to be performed by the second wireless audio output device to the source device during the audio session.

BRIEF DESCRIPTION OF THE DRAWINGS

FIG. 6 which illustrates examples of session resources during different stages of a source aided single-bud to dual-bud transition according to various exemplary embodiments.

DETAILED DESCRIPTION

Figure 1:
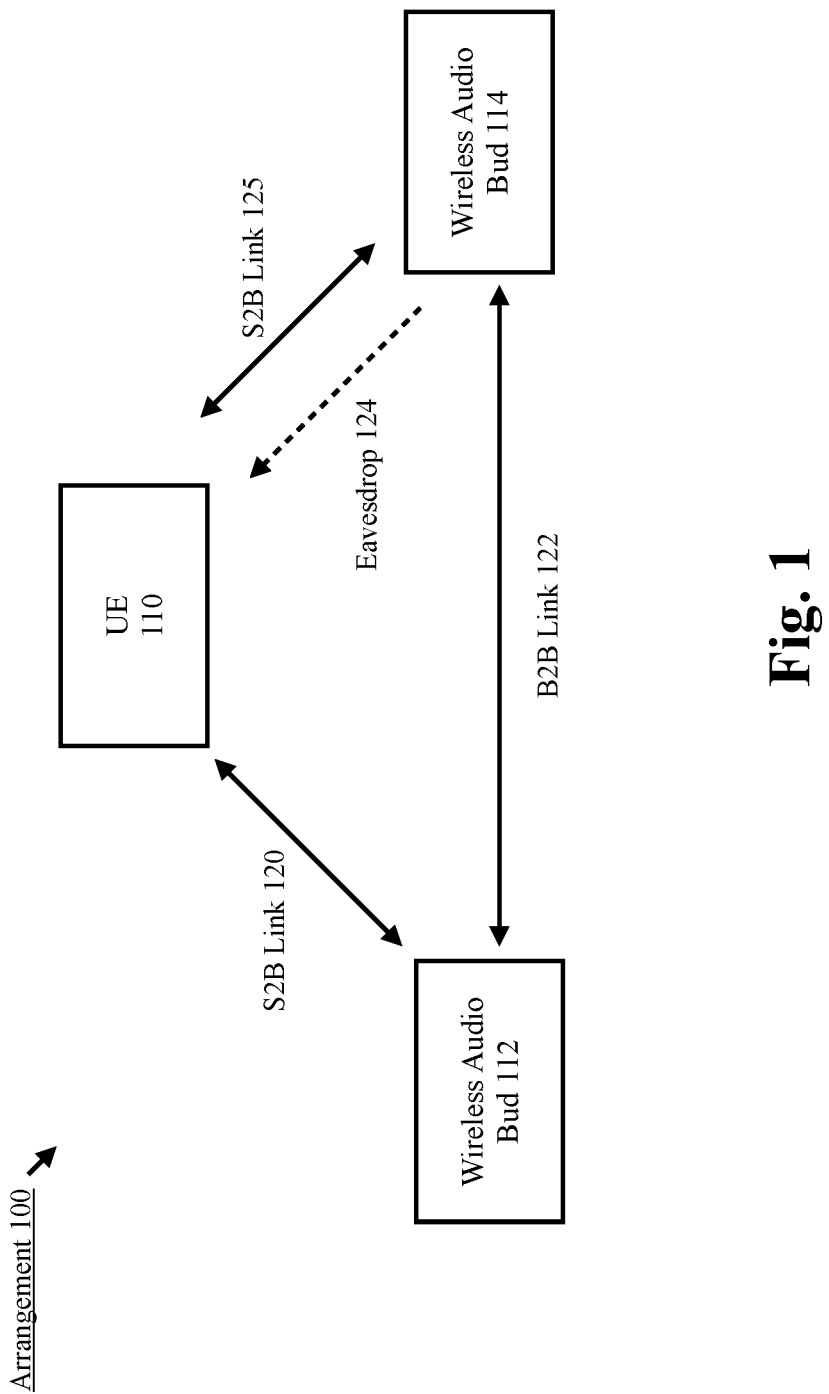
FIG. 1 shows an example arrangement of a user equipment (UE) and wireless audio buds according to various exemplary embodiments.

The exemplary (or example) embodiments may be further understood with reference to the following description and the related appended drawings, wherein like elements are provided with the same reference numerals. The exemplary embodiments relate to implementing techniques for an audio output device to join an existing audio session between a user equipment (UE) and another audio output device.

The exemplary embodiments are described with regard to the UE providing audio data to one or more wireless audio output devices. Throughout this description, the terms "UE" and "source device" may be used interchangeably. However, any reference to a UE or a source device is merely provided for illustrative purposes. The exemplary embodiments may be utilized with any electronic component equipped with hardware, software, and/or firmware configured to communicate with wireless audio output devices using a short-range communication protocol.

The UE may communicate with one or more wireless audio output devices. The term "wireless audio output device" generally refers to an electronic device that is configured to wirelessly receive audio data and generate audio output. Various examples described herein may reference wireless audio buds (e.g., ear buds, wireless headphones, etc.), which is a specific type of wireless audio output device. Throughout this description, any reference to wireless audio output devices or wireless audio buds is merely provided for illustrative purposes. The exemplary embodiments may be utilized with any electronic component equipped with hardware, software and/or firmware configured to communicate with a source device via a wireless communication protocol and generate audio output.

The exemplary embodiments are also described with regard to a short-range communication protocol that enables short-range communication between two or more devices. Various examples described herein may reference Bluetooth (e.g., Bluetooth, Bluetooth Low-Energy (BLE), etc.), which is a specific type of short-range communication protocol. However, the exemplary embodiments may be implemented using any type of wireless communication protocol or personal area network (PAN), e.g., WiFi Direct, etc. Throughout this description, any reference to the terms such as, "Bluetooth," "short-range communication protocol," "short-range connection," or "short-range communication link" is merely provided for illustrative purposes. The exemplary embodiments may apply to any appropriate type of communication protocol.

In addition, the exemplary techniques will be described with regard to an example scenario that includes a pair of wireless audio buds. The following description is provided as a general overview of the example scenario. A user has the UE and the pair of wireless audio buds. Initially, the user starts listening to music or a call using only a single wireless audio bud. Subsequently, the user wants to use both of the audio buds for this audio session. Under conventional circumstances, for any of a variety of different reasons, a connectivity issue may occur that causes interruptions in the audio output and/or prevents the second wireless audio bud from joining the existing audio session in a seamless manner.

The exemplary embodiments are configured to mitigate connectivity issues that may arise when an audio output device attempts to join an existing session between the source device and another audio output device. As will be described in more detail below, the exemplary embodiments include the source device communicating directly with one or more of the audio output devices to enable the audio output device to join an existing session. In one aspect, this may include the source device providing connection information to a wireless audio output device using a first frequency band when there is an existing session between the source device and another wireless audio output device over a second different frequency band. The connection information may enable the audio output device to join the existing session. For example, the source device may provide connection information to the audio output device over a 2.4 gigahertz (GHz) frequency band during an ongoing session between the source device and another audio output device over a 5 GHz frequency band (or vice versa).

In another aspect, the exemplary embodiments may include the source device informing the audio output device participating in the session that another audio output device is to join this session. This may mean that the devices are aware of the resources that are to be utilized by the audio output device joining the session. Specific examples of these exemplary techniques will be provided in detail below. Those skilled in the art will understand that the exemplary techniques described herein may be used in conjunction with other currently implemented connection techniques, future implementations of connection techniques, or independently from other connection techniques.

The example single-audio bud to dual-audio bud transition scenario referenced above is not intended to limit the exemplary embodiments in any way. While the exemplary techniques may mitigate connectivity issues that may occur under conventional circumstances during this common use case, the exemplary embodiments may also apply to any scenario in which one or more audio output devices attempt to join an existing session between the source device and one or more other audio output devices.

FIG. 1 shows an example arrangement 100 of UE 110 and wireless audio buds 112, 114 according to various exemplary embodiments. The exemplary arrangement 100 includes a UE 110. Those skilled in the art will understand that the UE 110 may represent any type of electronic component that is capable of communicating with one or more wireless audio output devices. Specific example of the UE 110 include, but are not limited to, mobile phones, tablet computers, desktop computers, smartphones, embedded devices, wearables, Internet of Things (IoT) devices, video game consoles, media players, entertainment devices, smart speakers, smart TVs, streaming devices, etc. As mentioned above, the terms "UE" and "source device" may be used interchangeably throughout this description.

The UE 110 may communicate with a pair of wireless audio buds 112, 114 (e.g., ear buds, wireless headphones, etc.). However, any reference to wireless audio buds is merely provided for illustrative purposes. The exemplary embodiments may apply to scenarios that include any appropriate type of audio output device, including one or more speakers and devices with one or more integrated speakers.

The example arrangement 100 also illustrates various types of communication links and/or interactions that may occur when using the short-range communication protocol. In some embodiments, a network of these connections may represent a PAN.

The arrangement 100 shows a source-to-audio bud (S2B) link 120 between the UE 110 and the wireless audio bud 112. In addition, an audio bud-to-audio bud (B2B) link 122 is shown between the wireless audio bud 112 and the wireless audio bud 114. In this example, the communication links 120, 122 may be Bluetooth connections or any other appropriate type of connection. Therefore, the UE 110 and the wireless audio buds 112, 114 may be equipped with an appropriate chipset to communicate using a short-range communication protocol.

In some embodiments, the wireless audio bud 114 may be enabled to eavesdrop 124 (or snoop) on data being exchanged on the S2B link 120. In some embodiments, the wireless audio bud 114 may establish a S2B link 125 with the UE 110. This additional S2B link 125 may be used instead of or in addition to the eavesdrop 124 and the B2B link 125.

Communication links (e.g., S2B 120, S2B 125, B2B 122) may be established using a manual approach, an automated approach or a combination thereof. The manual approach refers to a process in which user input at one or more of the devices triggers the initiation of a connection establishment procedure. The automated approach refers to a mechanism in which connection establishment is initiated without a user-supplied command, e.g., using sensor data, proximity detection, an automated trigger, and/or other operations.

As will be described in more detail below, the exemplary embodiments include implementing a source-initiated connection mechanism for establishing a communication link. The source-initiated connection may be implemented independently from these other approaches or may be used in conjunction with these approaches. For example, if an audio bud tries to establish a connection with another audio bud and fails, the source-initiated approach may be utilized. Additional details regarding the source-initiated approach are provided below with regard to FIGS. 4-6.

The arrangement 100 illustrates a possible network of short-range connections among the UE 110 and the wireless audio buds 112, 114. However, as indicated above, the exemplary embodiments may relate to scenarios in which a wireless audio output device joins an existing session. Thus, throughout this description, various examples will be described with regard to scenarios that begin in a state where the eavesdrop 124, the B2B link 122 and/or a second S2B link 125 have not yet been (or will not be) configured.

In some embodiments, the UE 110 and the audio bud 112 have a primary/secondary relationship over the S2B link 120 where the UE 110 is in control and/or has priority over the audio bud 112. Similarly, the UE 110 and the audio bud 114 may also have a primary/secondary relationship over the S2B link 125 where the UE 110 is in control and/or has priority over the audio bud 114.

In addition, the audio bud 112 and the audio bud 114 may have a primary/secondary relationship over the B2B link 122 where the audio bud 112 is in control and/or has priority over the audio bud 114. In other embodiments, devices connected via a short-range communication protocol (e.g., S2B link 120, S2B link 125, B2B link 122) may have a mutual relationship where the devices share or negotiate certain responsibilities.

A primary/secondary relationship between audio buds may be dynamic. For example, at a first time, the audio bud 112 may be set as the primary device and the audio bud 114 may be set as the secondary device. Subsequently, a predetermined condition may trigger the audio bud 114 to be set as the primary device. Thus, at a second time, the audio bud 114 may be set as the primary device and the audio bud 112 may be set as the secondary device. During a session (e.g., streaming, a cell, etc.), the pair of audio buds 112, 114 may switch roles any number of times.

Figure 2:
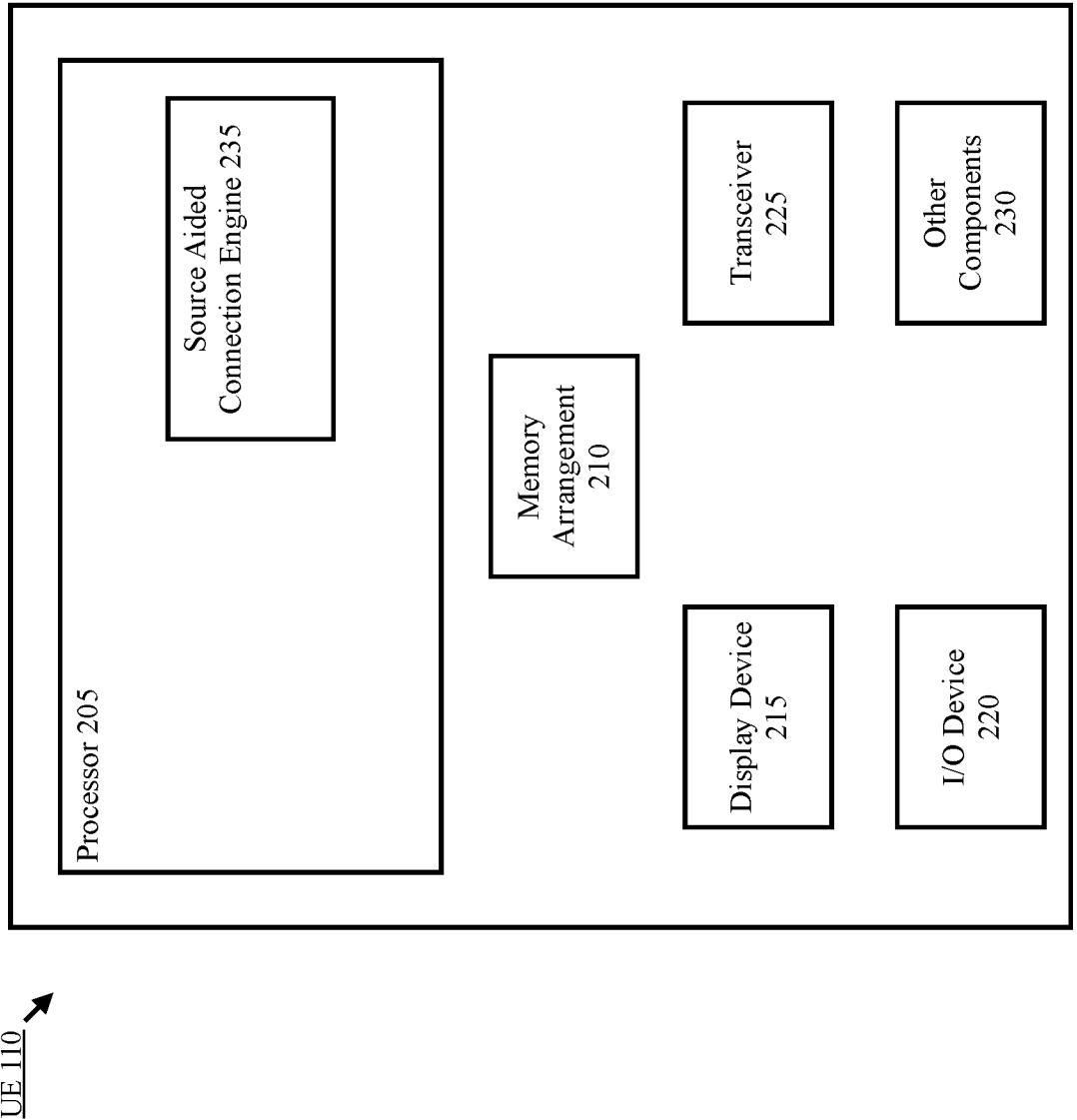
FIG. 2 shows an example UE according to various exemplary embodiments.

FIG. 2 shows an example UE 110 according to various exemplary embodiments. The UE 110 will be described with regard to the arrangement 100 of FIG. 2. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include a source aided connection engine 125. The source aided connection engine 235 may be configured to perform operations related to the single-bud to the dual-bud transition scenario referenced throughout this description. As will be described in more detail below, these operations may include providing an audio bud with information that may enable to audio bud to join an existing session between the UE 110 and another audio bud.

The above referenced engine 235 being an application (e.g., a program) executed by the processor 205 is merely provided for illustrative purposes. The functionality associated with the engine 235 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen.

The transceiver 225 may represent one or more hardware components configured to perform operations related to wireless communication. For example, the transceiver 225 may represent one or more radios configured to communicate with a cellular network, a PAN, a wireless local area network (WLAN), etc. As indicates above, the exemplary embodiments may include the UE 110 communicating with a first audio output device over a first frequency band and a second audio output device over a second different frequency band. Accordingly, the transceiver 225 may operate on a variety of different frequencies or channels (e.g., set of consecutive frequencies).

Figure 3:
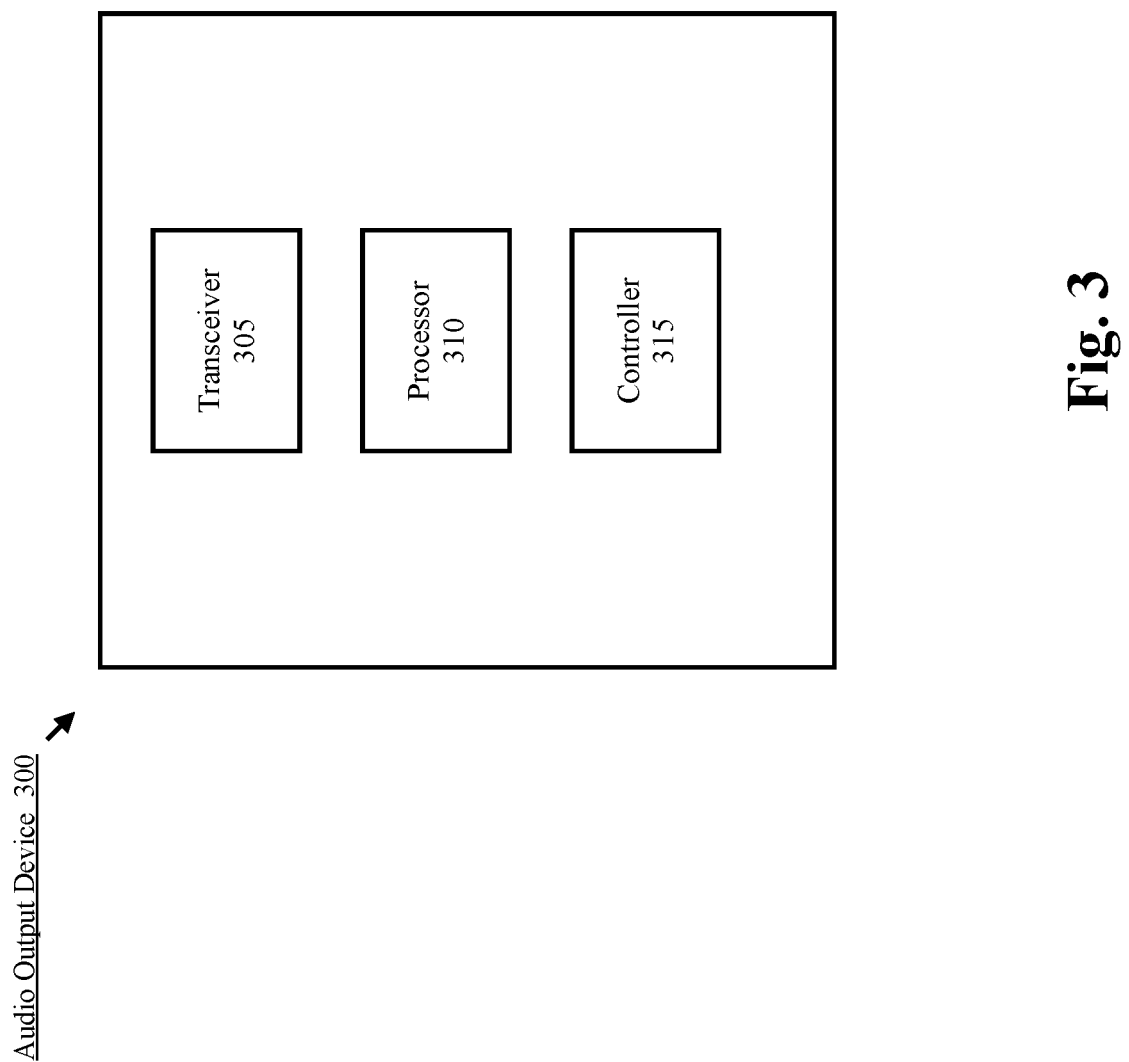
FIG. 3 shows an example audio output device according to various exemplary embodiments.

FIG. 3 shows an example audio output device 300 according to various exemplary embodiments. The audio output device 300 may represent either or both of the audio buds 112, 114 shown in the arrangement 100.

The device 300 may include a transceiver 305, a processor 310 and a controller 315. In addition, the device 300 may include other components (not shown) such as, but not limited to, a memory, a battery and ports to electrically connect the device 300 to other electronic devices.

The transceiver 305 may represent one or more hardware components configured to perform operations related to wireless communication. For example, the transceiver 305 may represent one or more radios configured to communicate with a PAN or any other appropriate type of network. The transceiver 305 may enable a short-range connection to be established using frequencies or channels associated with the short-range connection (e.g., Bluetooth). In some embodiments, these frequencies may include the 2.4 GHz and 5 GHz bands. Accordingly, the transceiver 305 may operate on a variety of different frequencies or channels (e.g., set of consecutive frequencies).

The processor 310 may be configured to execute a plurality of engines for the audio output device 300. For example, the processor 310 may perform operations related to receiving connection information from a source device and joining an existing audio session. In some embodiments, the processor 310 may be represented as a separate incorporated component of the audio output device 300 or may be a modular component coupled to the audio output device 300, e.g., an integrated circuit with or without firmware. For example, the processor 310 may be a chip or integrated circuit compatible with the short-range communication protocol that includes input circuitry to receive signals and processing circuitry to process the signals and other information. The engines may also be embodied as one application or separate applications. In some embodiments, the functionality described for the processor 310 is split among two or more processors such as a baseband processor and an applications processor. In other embodiments, the transceiver 305 may also be configured to execute engines and/or operations for the audio output device 300.

The controller 315 may be configured to control the communication functions of the transceiver 305 and/or the processor 310. In addition, the controller 315 may also control non-communication functions related to the other components such as the memory, the battery, etc. Accordingly, the controller 315 may perform operations associated with an applications processor. The exemplary embodiments may be implemented in any of these or other configurations of an audio output device.

Figure 4:
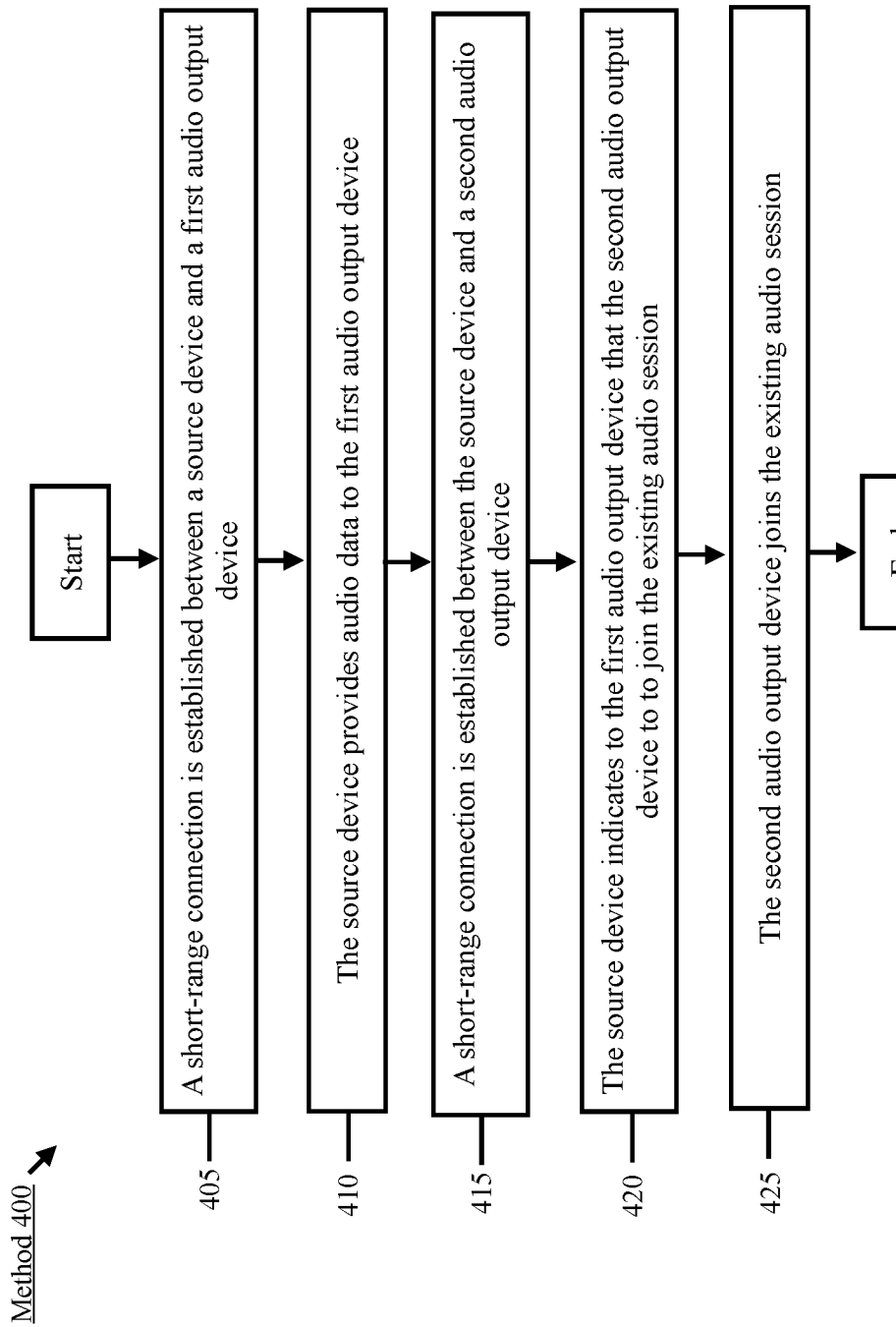
FIG. 4 shows an example method for an audio output device to join an existing session.

FIG. 4 shows an example method 400 for an audio output device to join an existing session. Throughout the description of the method 400 there may be references to the single-bud to dual-bud transition scenario to illustrate an example of the conditions under which the exemplary techniques may be utilized. However, as indicated above, the exemplary embodiments are not limited to any particular scenario and may be applicable to any scenario involving an audio output device joining a session between the source device and one or more audio output devices.

In 405, a short-range connection is established between a source device and a first audio output device. The short-range connection may be established using either the manual approach or the automated approach.

In 410, the source device provides audio data to the first audio output device. The audio data described herein represents any type of payload data that may provide the basis for generating audio output.

The transfer of audio data from the source device to the first audio output device utilizes (x) percent of the first audio output device's available bandwidth. As x increases, the likelihood that the first audio output device will be able to maintain an adequate audio quality and facilitate a connection establishment procedure for a second audio output device decreases. To provide an example within the context of the arrangement 100, consider a scenario in which only the S2B link 120 has been established. Under conventional circumstances, the audio bud 112 may provide connection information directly to the audio bud 114. This connection information may facilitate the establishment of the B2B link 122, the eavesdrop 124 and/or the S2B link 125. However, when the audio data being transmitted over the S2B link 120 utilizes more than a threshold amount of bandwidth there may not be enough bandwidth available for the audio bud 112 to also transmit the connection information and/or exchange synchronization information with the audio bud 114. As a result, the audio bud 114 may be unable to connect to the other devices in a seamless manner. The exemplary embodiments mitigate these types of connectivity issues by utilizing the source device to help the second audio output device join the existing audio session.

Some types of communications such as ultra-low latency audio (ULLA) may have defined performance requirements. These requirements may cause the audio buds to utilize a larger portion of their available bandwidth and thus, prevent conventional mechanisms from being able to facilitate a single-bud to dual-bud transition during an existing audio session. It may be beneficial to implement the exemplary techniques described herein to ensure that the communication protocol requirements are satisfied with regard to the audio session and an adequate user experience is provided, e.g., a seamless single-bud to dual-bud transition.

In addition to the bandwidth limitations, other factors may cause connectivity issues that prevent the establishment of the B2B link 122 and/or the eavesdrop 124. For example, the radio frequency (RF) conditions relative to each of the audio buds 112, 114 and/or the distance between the audio buds 112, 114 is another factor that may prevent the audio bud 114 from detecting and/or connecting to the other devices. The exemplary embodiments may also mitigate these type of connectivity issues.

The source device may be equipped with multiple radios. For example, a first radio may be configured for the 2.4 GHz band and a second radio may be configured for the 5 GHz band. In this example, the source device utilizes one of the radios and its corresponding frequency band to provide the audio data to the first audio output device. As will be described in more detail below, the other radio and frequency band may be utilized by the source device to provide connection information to a second audio output device that enables the second audio output device to join the ongoing audio session between the source device and the first audio output device. In other arrangements, the source device may have multiple radios, e.g., shored radios, each capable of communicating using one or more bands.

Figure 5:
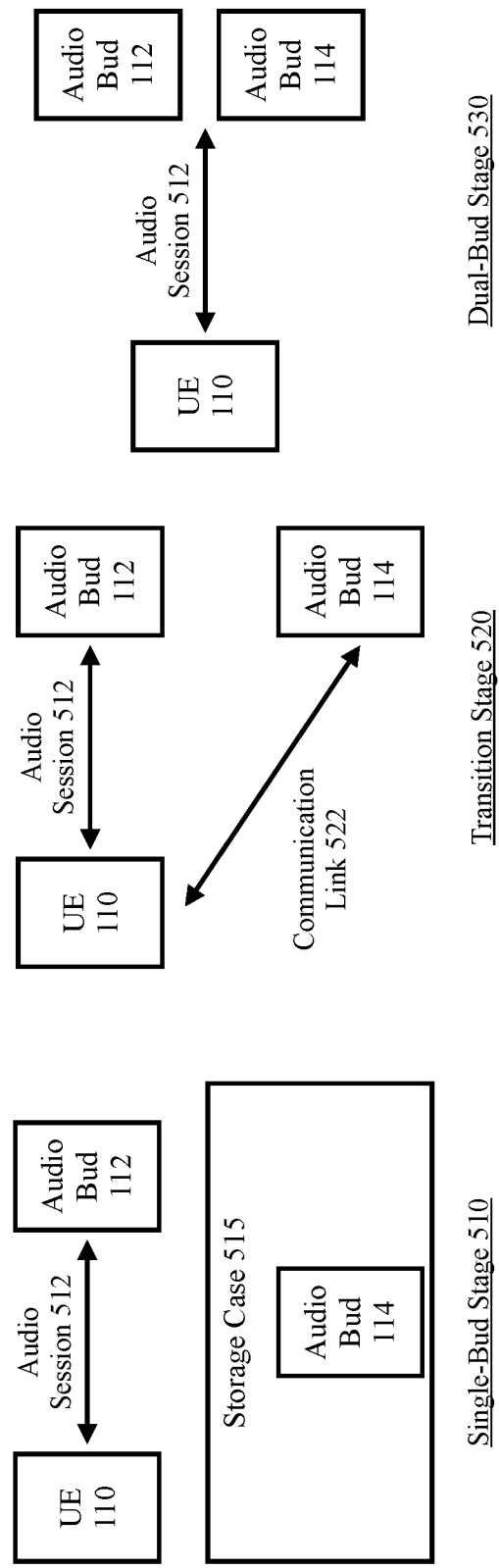
FIG. 5 illustrates an example of multiple stages of a source aided single-bud to dual-bud transition according to various exemplary embodiments.

Throughout the description of the method 400, reference may be made to FIG. 5, which illustrates an example of multiple stages of a source aided single-bud to dual-bud transition according to various exemplary embodiments. The single-bud stage 510 shows the UE 110 connected to the audio bud 112. Within the context of the method 400, at this time, the UE 110 and the audio bud 112 may have performed the operations referenced above in 405-410. Therefore, the single-bud stage 510 illustrates an audio session 512. Since the audio bud 112 is the only audio bud deployed, the audio bud 112 is serving as the primary audio bud.

In this example, the audio bud 114 is currently in a storage case 515. In addition to being able to store the wireless audio buds 112, 114, the storage case 515 may also be capable of charging the wireless audio buds 112, 114. In some embodiments, the state of the storage case 515 (e.g., closed, open, etc.) and/or audio buds 112, 114 relative to the storage case 515 (e.g., charging, outside of the case, within the case, etc.) may trigger any number of actions by the wireless audio buds 112, 114 or the UE 110. For instance, if the audio bud 114 is removed from the storage case 515, the audio bud 114 may be triggered to search another device or advertise its own availability. However, any reference to the storage case 515 is merely provided for illustrative purposes, the functionality of the storage case is beyond the scope of the exemplary embodiments. The exemplary techniques described herein may be implemented regardless of whether a storage case or similar device is utilized.

In addition, throughout the description of FIGS. 4-5, reference may be made to FIG. 6 which illustrates examples of session resources during different stages of a source aided single-bud to dual-bud transition. In FIG. 6, during the single-bud stage 510, the UE 110 is connected to the audio bud 112. A first portion of the available resources are assigned for transmitting audio data to the audio bud 112 (e.g., transmission opportunities 605) and a second portion of the available resources are assigned for receiving information and/or data transmitted by the audio bud 112 (e.g., reception opportunities 610). For example, the UE 110 may receive feedback indicating whether the audio bud 112 successfully received audio data transmitted by the UE 110 during reception opportunities 610.

Returning to the method 400, in 415, a short-range connection is established between the source device (e.g., UE 110) and the second audio output device. This short-range connection is not utilized to provide audio data (e.g., audio payload data). Instead, the source device may utilize this short-range connection to provide connection information to the second audio output device. Generally, this connection information may represent any type of control information and/or payload data that may enable the second audio output device to join the existing audio session, between the source device and the first audio output device. For example, the connection information may include any/all of connection credentials, connection parameters, PAN information, keys, synchronization information, connection timing information, permission, etc.

In some embodiments, the short-range connection may be established after an attempt by the second audio output device to join the existing audio session in a different manner. For example, the second audio output device may initially attempt to establish a communication link to the first audio output device (e.g., B2B link). Due to any of a variety of different factors (e.g., bandwidth, distance, the second audio output device may not be able to detect and/or connect to the first audio output device. After this connection attempt fails one or more times, the second audio output device may be triggered to establish the short-range connection to the source device. However, any reference to this short-range connection being triggered by a particular condition or event is merely provided for illustrative purposes. The exemplary embodiments may utilize any appropriate trigger to initiate the establishment of the short-range connection between the second audio output device and the source device.

The short-range connection established in 415 may be temporary relative to the audio session. As indicated above, the audio data may be transmitted to the first audio output device using one radio and the corresponding frequency band and the connection information may be transmitted to the second audio output device using the other radio and the corresponding frequency band. During the audio session, the source device may also inform the first audio output device that the second audio output device is to join the existing audio session. This ensures that the source device and the first audio output device have a common understanding with regard to which resources are to be utilized by the second audio output device.

To provide an example, in the transition stage 520 of FIG. 5, the UE 110 is still connected to the audio bud 112. However, the second audio bud 114 has now been removed from the storage case 515 and is connected to the UE 110 via the short-range communication link 522. The short-range communication link 522 may enable the transfer of connection information associated with the audio session 512. However, the short-range communication link 522 is not part of the audio session 512.

Prior to the establishment of the short-range communication link 522, when the audio bud 114 is triggered to perform connection establishment operations, the audio bud 114 may attempt to connect to any device. In other embodiments, the audio bud 114 may first attempt to connect to its peer (e.g., audio bud 112) or another device based on previously used connection parameters and then search for other devices (e.g., the source device, etc.) if the initial attempt is unsuccessful. In further embodiments, the audio bud 114 may initially attempt to connect to the source device. Therefore, in some embodiments, the audio bud 114 may initially search for and attempt to connect to the UE 110. In other embodiments, the audio bud 114 may search for and attempt to connect to the UE 110 if the audio bud 114 is unable to find or connect to the audio bud 112 or another audio output device.

From the perspective of the UE 110, the audio session 512 and the short-range communication link 522 may correspond to different radios and/or frequency bands. In this example, the UE 110 utilizes a first radio configured to communicate over the 5 GHz band for the audio session with audio bud 112 (e.g., communication link 512) and a second different radio configured to communicate over the 2.4 GHz band for the connection information (e.g., communication link 522). However, reference to the 5 GHz and 2.4 GHz bands is merely provided for illustrative purposes to demonstrate two different frequency bands. The exemplary embodiments may apply to any appropriate frequency bands.

During the transition stage 520, the UE 110 may also notify the audio bud 112 that the audio bud 114 is to join the audio session 512. For example, the UE 110 may determine that the audio bud 114 wants to join the existing audio session based at least in part on information received from the audio bud 114. The UE 110 may then transmit an indication to the audio bud 112. In response, the UE 110 and/or the audio bud 112 may ensure that a third portion of the available resources are reserved for the audio bud 114. Subsequently, the UE 110 may notify the audio bud 114 that the audio session 512 has been modified to include communications transmitted by audio bud 114 (e.g., feedback or any other appropriate type of information).

In FIG. 6, the transition stage 520 shows empty spaces 615 between transmission opportunities 605 and reception opportunities 610. The empty spaces 615 represent the portion of the resources that may be utilized by the audio bud 114. A comparison of the initial stage 510 and the transition stage 520 in FIG. 6 shows that the available resources for the audio bud 112 (e.g., reception opportunities 610) have decreased to make room for the communications transmitted by the audio bud 114. This example demonstrates that during the audio session 512, the audio bud 112 may modify the size of its packets in response to or based on an indication from the UE 110 that the audio bud 114 is to join the existing audio session 512.

Returning to the method 400, in 420, the source device indicates to the first audio output device that the second audio output device is to join the existing audio session. An example of this is described above with regard to the transition stage 520 of FIG. 5. However, any reference to the source device providing this indication to the first audio output device is merely provided for illustrative purposes. The exemplary embodiments may utilize any appropriate mechanism to inform the first audio output device about the second audio output device joining the session.

In 425, the second audio output device joins the existing audio session between the source device and the first audio output device using the connection information provided by the source device.

In the third stage 530 of FIG. 5, the audio bud 114 has joined the audio session 512. To provide an example within the context of the arrangement 100, during the third stage 530, the UE 110 may be connected to the audio bud 112 via the S2B link 120 and at least one of the eavesdrop 124, the S2B link 125 or the B2B link 122 is configured to enable the audio bud 114 to receive the audio data for this session.

In some embodiments, a B2B link may be established. However, like the connectivity issues referenced above, if the audio session is utilizing a certain amount of the available bandwidth, there may not be enough available bandwidth for the B2B link 122 to be established or utilized in its expected manner. Thus, it may be beneficial to use the eavesdrop 124 and/or the S2B link 125 in addition to or instead of the B2B link 122.

In FIG. 6, during the dual-bud stage 630, the UE 110 is connected to the audio buds 112, 114. Accordingly, in this example, a first portion of the available resources are reserved for the UE 110 to transmit audio data (e.g., transmission opportunities 605), a second portion of the available resources are reserved for the audio bud 112 to transmit information (e.g., reception opportunities 610) and a third portion of the available resources are now reserved for the audio bud 114 to transmit information, e.g., reception opportunities 620).

The examples provided above with regard to FIGS. 4-6 referenced a scenario in which a single audio bud joins an existing audio session between a source device and another single audio bud. However, the exemplary embodiments are not limited to this type of scenario and may apply to any scenario in which one or more audio output devices attempt to join an existing session between the source device and one or more audio output devices. For instance, there may be a scenario in which a first user is listening to an audio session using both of their audio buds (e.g., dual-bud arrangement) and a second user wants to listen to the audio session using their own audio buds. Those skilled in the art will understand how the exemplary concepts described herein may be applied to this type of scenario where one or more audio output devices join an existing session between a source device and two or more audio output devices.

The exemplary embodiments were described with regard to a scenario in which the user starts an audio session with a single audio bud. However, the exemplary embodiments are not limited to this scenario and may also be used to re-connect an audio bud to the audio session. To provide an example, an audio session may be configured to include two wireless audio buds. During the audio session, one of the wireless audio buds may be removed and placed in its storage case for charging. Thus, the audio session is now configured for a single audio bud. Subsequently, during the same audio session, the audio bud may be removed from storage case and reconnect to the audio session. The exemplary techniques described herein may also be used during this type of scenario.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor configured to cause a source device to perform operations comprising:
   transmitting audio data associated with an audio session, using a first frequency band, to a first wireless audio output device;
   transmitting connection information associated with the audio session to a second wireless audio output device over a second frequency band, wherein the second frequency band differs from the first frequency band and the connection information allows the second wireless audio output device to join the audio session;
   transmitting an indication to the first wireless audio output device that the second wireless audio output device is to join the audio session, wherein the indication is configured to cause the first wireless audio output device to modify a packet size used for feedback during the audio session;
   transmitting subsequent audio data associated with the audio session, after transmitting the connection information, to the first wireless audio output device and the second wireless audio output device;
   receiving feedback from the first wireless audio output device in response to the subsequent audio data; and
   receiving feedback from the second wireless audio output device in response to the subsequent audio data.

2. The processor of claim 1, the operations further comprising:
   configuring one or more reception opportunities corresponding to the second wireless audio output device.

3. The processor of claim 1, wherein the first wireless audio output device is a primary wireless audio bud and the second wireless audio output device is a secondary wireless audio bud.

4. The processor of claim 1, wherein the audio session comprises a ultra-low latency audio (ULLA) session.

5. The processor of claim 1, wherein the audio session is enabled by a personal area network (PAN).

6. The processor of claim 5, wherein when the audio session includes the first wireless audio output device and the second wireless audio output device, the PAN comprises a source-to-bud (S2B) link and at least one of an eavesdrop, a bud-to-bud (B2B) link or a further S2B link.

7. The processor of claim 1, wherein the first frequency band and the second frequency band comprise a 5 gigahertz (GHz) frequency band and a 2.4 GHz frequency band respectively.

8. A processor configured to cause a first wireless audio output device to perform operations comprising:
   establishing a communication link to a source device using a wireless communication protocol;
   receiving from the source device audio data associated with an audio session;
   receiving an indication that a second wireless audio output device is to join the audio session;
   modifying a packet size that is to be used by the first wireless audio output device to transmit feedback to the source device from a first packet size to a second packet size to accommodate transmissions that are to be performed by the second wireless audio output device to the source device during the audio session; and
   transmitting, after the second wireless audio output device joins the audio session, the feedback to the source device using the second packet size.

9. The processor of claim 8, wherein the first wireless audio output device is a primary wireless audio bud and the second wireless audio output device is a secondary wireless audio bud.

10. The processor of claim 8, wherein the audio session is enabled by a personal area network (PAN).

11. The processor of claim 8, wherein the audio data and the indication are received over a same communication link.

12. The processor of claim 8, wherein the audio session comprises a ultra-low latency audio (ULLA) session.

13. The processor of claim 8, wherein the communication link is established on a 5 gigahertz (GHz) frequency band or a 2.4 GHz frequency band.

* * * * *